Figure 1:
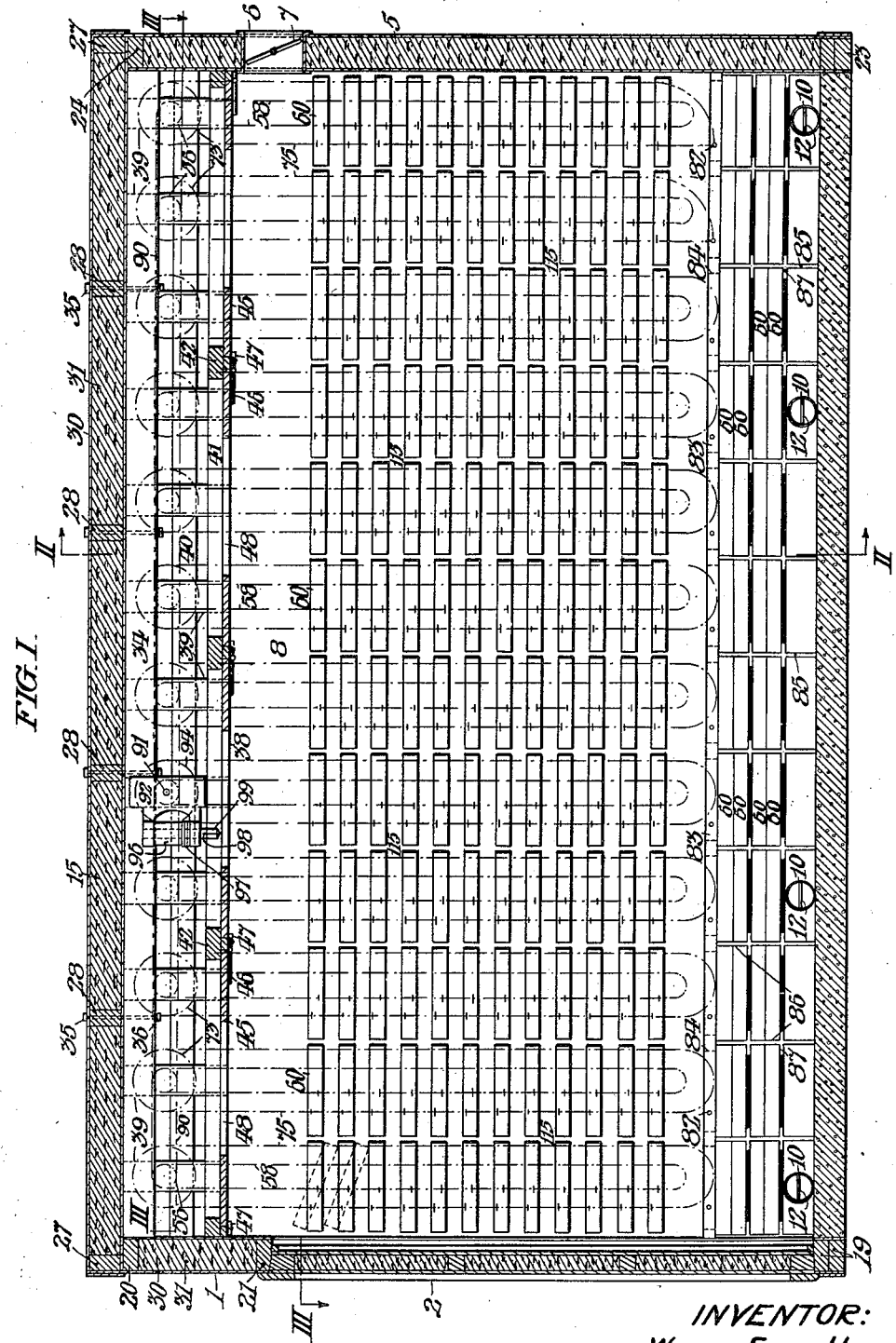

July 23, 1929.  W. F. HILLPOT  1,722,214
INCUBATOR
Filed July 5, 1927  5 Sheets-Sheet 1

INVENTOR:
WILLIAM FINNEY HILLPOT,
Attorney.

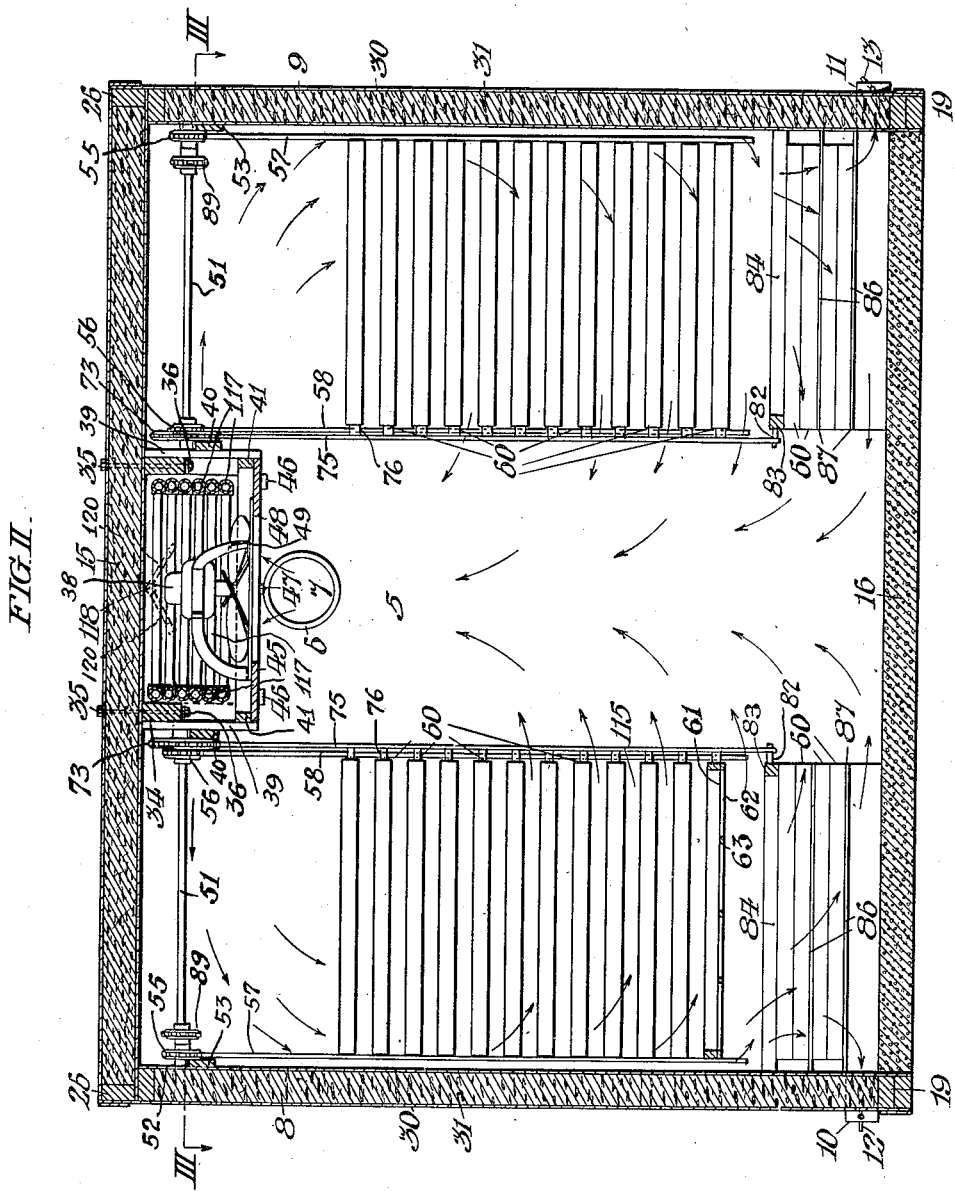

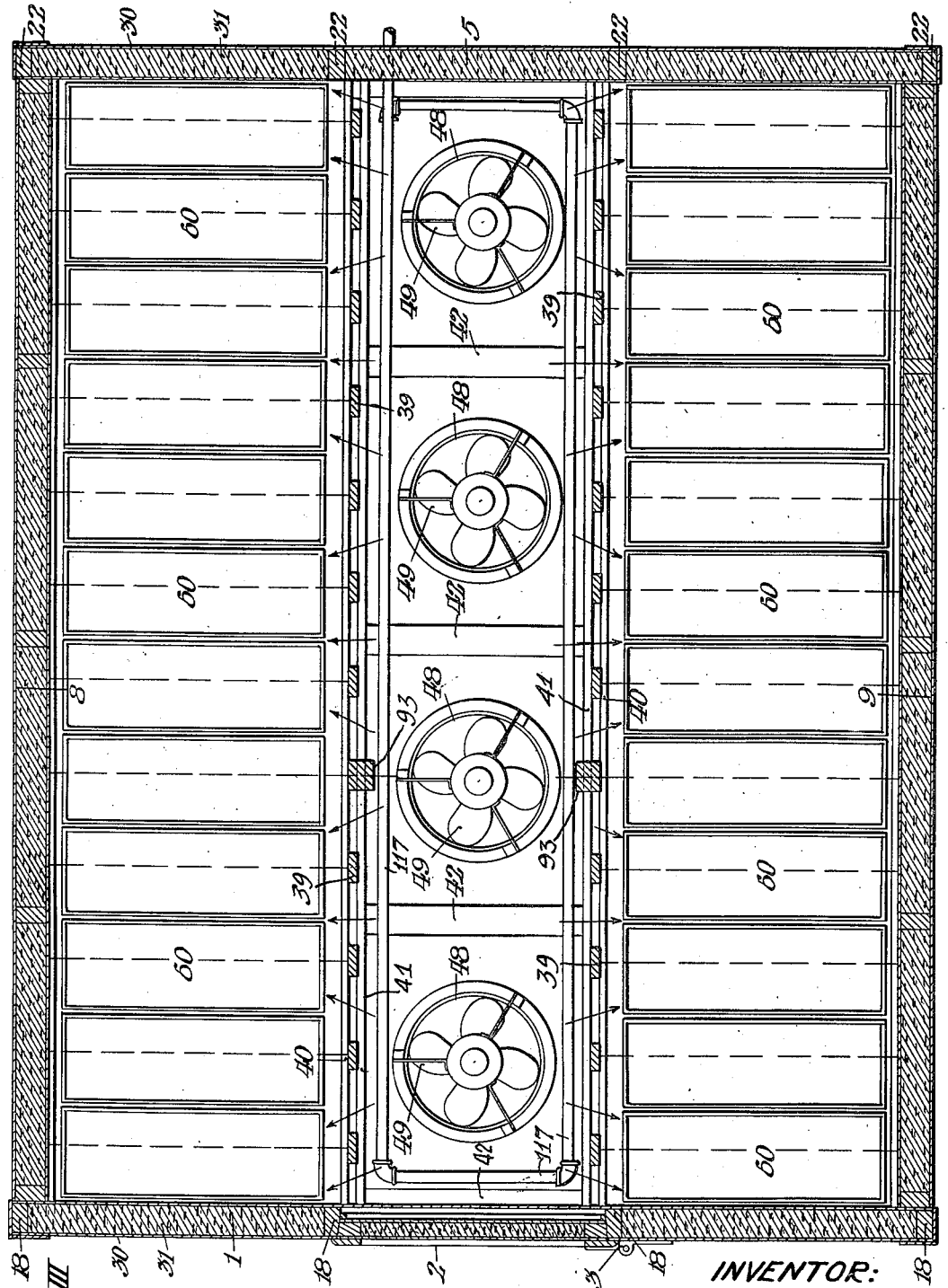

July 23, 1929.  W. F. HILLPOT  1,722,214
INCUBATOR
Filed July 5, 1927   5 Sheets-Sheet 4
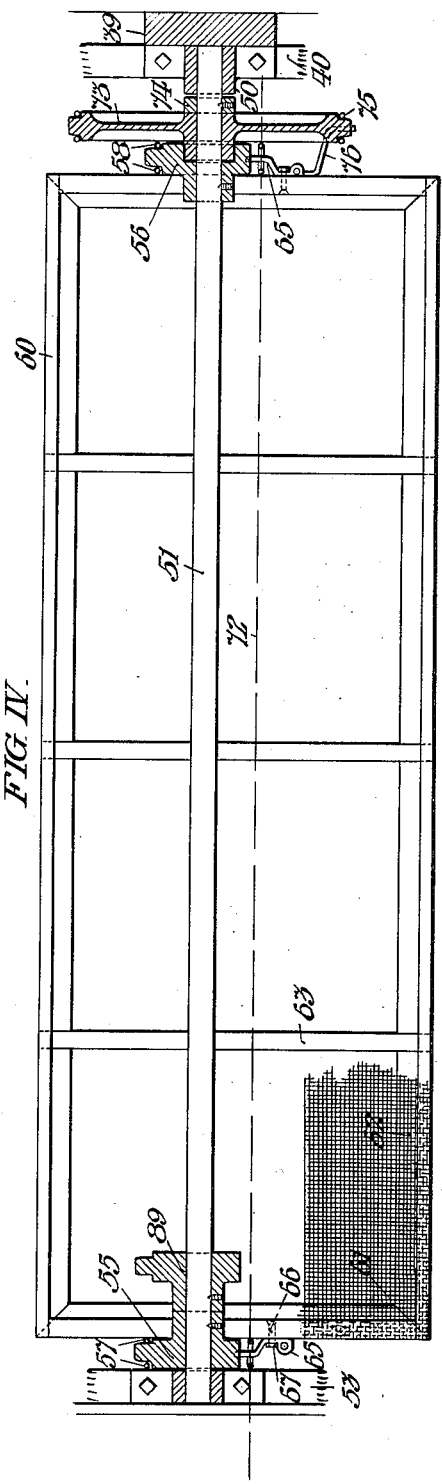
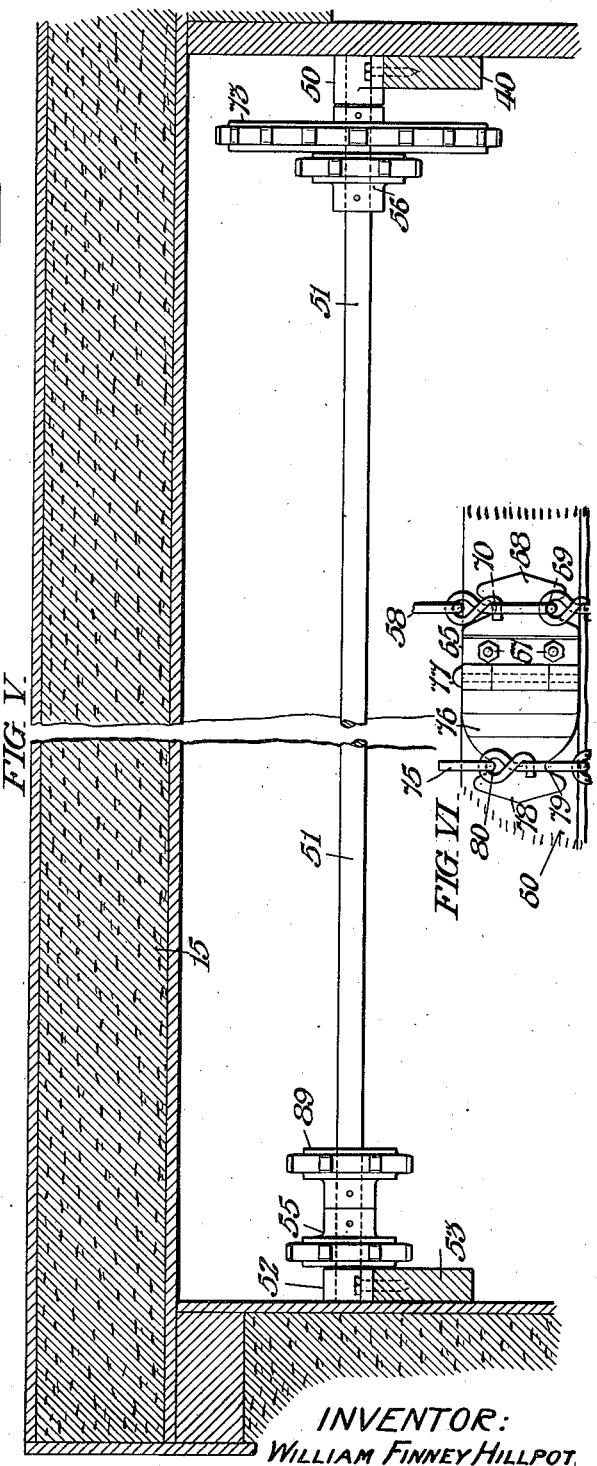
INVENTOR:
WILLIAM FINNEY HILLPOT July 23, 1929.  W. F. HILLPOT  1,722,214
INCUBATOR
Filed July 5, 1927   5 Sheets-Sheet 5
*FIG. VII.*
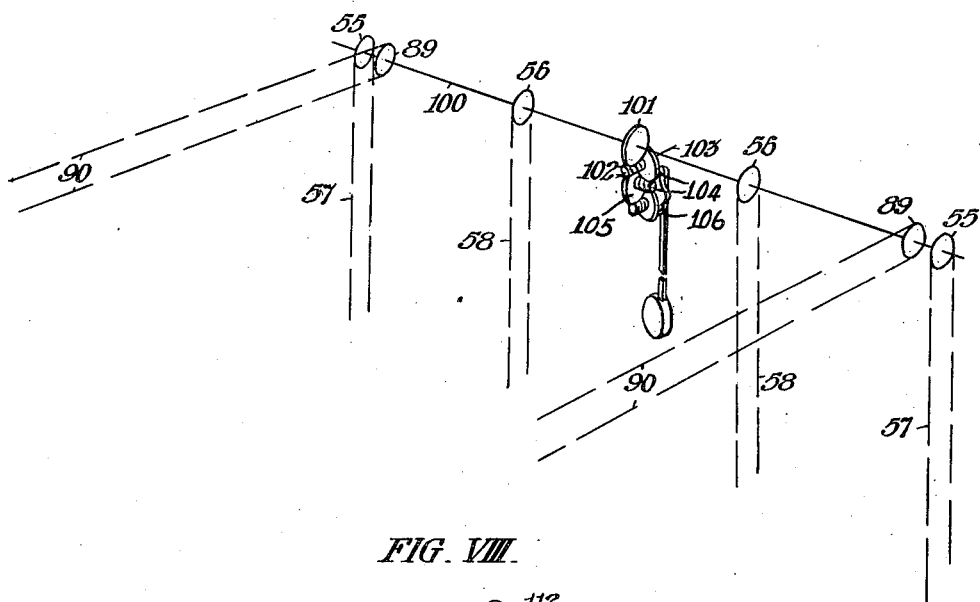
*FIG. VIII.*
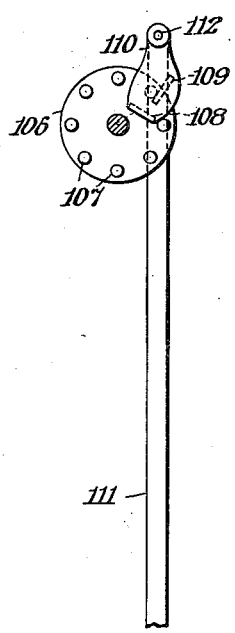
INVENTOR:
WILLIAM FINNEY HILLPOT, Patented July 23, 1929.

1,722,214

UNITED STATES PATENT OFFICE.

WILLIAM FINNEY HILLPOT, OF FRENCHTOWN, NEW JERSEY.

INCUBATOR.

Application filed July 5, 1927. Serial No. 203,459.

It is the object of my invention to provide means for supporting eggs, during the period of incubation thereof, in such manner that the eggs may be repeatedly turned, at intervals, in simulation of the turning movements naturally imparted to such eggs by the mother birds, and in such environment as to afford the desired degree of warmth during such period, while maintaining the eggs in such relation to each other that they may be individually inspected at any time.

My improvements are particularly applicable to incubators of the class disclosed in Letters Patent of the United States granted to me and respectively No. 1,489,597 dated April 8, 1924 and No. 1,545,425 dated July 7, 1925; in that the egg supports are suspended upon endless flexible connectors, conveniently chain belts, so that such supports may be shifted to positions of inclination in different directions, with consequent changes in position of the eggs carried thereby, and may be shifted by said belts from the region of charge to a region of discharge of the eggs, as distinguished from incubators of the prior art in which it is necessary to manually remove and replace the eggs with respect to supports upon which they rest in successive steps from the region of charge to the region of discharge.

As hereinafter described, I find it convenient to provide egg supporting means including trays which are rectangular frames open at the top but covered at the bottom with foraminous material, such as insect wire screening; each of said trays having, at opposite ends thereof, axially alined pivot means in eccentric relation to the center of gravity of the tray and adapted to engage in links of the chain belts so that each of the trays is normally overbalanced to one side, so as to assume a position of inclination in that direction, unless otherwise detained, and I provide means for temporarily detaining each tray, in the opposite position of inclination, against the gravitative effect of its overbalancing aforesaid. Of course, allowance must be made, in the area of such egg trays, for the fact that eggs are of different sizes as well as to afford sufficient space to permit the aforesaid turning movement of the eggs. Consequently, it is practically impossible to maintain the egg trays balanced upon central pivots owing to the displacement of the eggs in the trays.

The effect of my improved construction and arrangement is that each tray rests stably in either position of inclination, as distinguished from devices of the prior art in which the trays are balanced upon pivotal connections extending coaxially in planes coincident with the center of gravity of the trays; so that the latter may be accidentally tilted in either direction by such disturbances of equilibrium of the tray and its contents incident to irregularities in the placement of the eggs in the trays. As hereinafter described; such egg trays are suspended in tiers in vertical columns or groups supported by chains at opposite ends of the trays.

An adjunctive feature of my invention is that means are provided for contemporaneously shifting a plurality of such vertical tiers of trays. Moreover, such means connecting the groups of trays for contemporaneous movement may be automatically and chronologically controlled; so that each tray may be automatically progressed from the position in which a fresh egg is placed therein to the position in which a chick is hatched therefrom and ready to be discharged. As hereinafter described, such control mechanism may include a pendulum.

My invention includes the various novel features of construction and arrangement hereinafter more definitely specified.

In said drawings; Fig. I is a longitudinal sectional view of an incubator conveniently embodying my improvement.

Fig. II is a transverse sectional view of said incubator, taken on the line II, II in Fig. I, in the direction of the arrows.

Fig. III is a horizontal plan sectional view taken on the line III, III in Figs. I and II.

Fig. IV is a fragmentary, partly sectional, plan view of the structure indicated in Fig. III; showing one of the egg trays at the upper portion of Fig. III with the shaft and sprocket wheels by which a vertical series of such trays are supported for sumultaneous movement.

Fig V is a fragmentary vertical sectional view of the upper left hand corner of the incubator structure shown in Fig. II showing an elevation of the tray supporting shaft and wheels indicated in Fig. IV.

Fig. VI is a fragmentary end elevation of the right hand end of the tray shown in Fig. IV and showing the configuration of the hook ends of the pivotal tray support.

Fig. VII is a diagram indicating the general arrangement of means for automatically controlling the movement of the tray supports, and Fig. VIII shows the escapement thereof.

In said figures; the rectangular incubator inclosure comprises the front wall 1 provided with the door 2 which is conveniently hinged at 3. The rear wall 5 which is conveniently provided with the fresh air inlet port 6 controlled by the valve 7 may be otherwise imperforate, as shown, or may have a door similar to the door 2. The opposite side walls 8 and 9, of the incubator inclosure, may be imperforate, except for series of air vents 10 and 11 which are disposed at convenient intervals throughout the length thereof and respectively controlled by valves 12 and 13. The ceiling 15, supported by said four walls 1, 5, 8, and 9, may be imperforate as indicated. I find it convenient to form the floor of said incubator inclosure of a single slab of concrete, molded within said four walls.

Said front wall 1 is conveniently formed of vertical wooden studs 18 connected by double sills 19 and the single cap member 20 and a lintel 21 for the doorway for said door 2. The rear wall is conveniently formed of vertical studs 22 connected by double sills 23 and the single cap member 24. Said ceiling 15 is conveniently formed of longitudinal joists 26 connected by transverse timbers 27 respectively above said walls 1 and 5, and by intermediate timbers 28, as indicated in Fig. I.

The wall frames above described are sheathed inside and outside with comparatively thin sheet material 30 such as the artificial lumber known as celotex (which is a web of compressed matted cane fibers), and inclose heat insulating material 31 such as comminuted cork.

Intermediate of the width of said incubator structure, a pair of timber stringers 34 are suspended in parallel spaced relation by bolts 35 extending through the intermediate ceiling timbers 28 and provided with nuts 36. Said stringers 34 support, in suspension from the ceiling 15, the housing 38 comprising vertical hangers 39, disposed in the spaced relation indicated in Figs. I and III, and connected by the longitudinal frame members 40 and 41 indicated in Figs. II and III; said members 41 being rigidly connected in spaced relation by transverse members 42 forming frames for doors 45 which may be removably held therein conveniently upon hinges 46 at their rear edges and latches 47 at their front edges. Each of said doors has an air port 48 and supports the electric fan 49 arranged to progress air therethrough.

As indicated in Figs. IV and V, said longitudinal frame members 40 are rails supporting the bearings 50 for the tray supporting shafts 51, which have their opposite ends journaled in the bearings 52 supported by the rails 53 which extend parallel with said rails 40. Each of said shafts 51 has, rigidly connected therewith, one sprocket chain wheel 55 and one sprocket chain wheel 56; carrying the tray supporting endless chains 57 and 58 which are respectively pendent at opposite ends of groups of twelve trays 60, arranged in tiers in a vertical column.

Each of said trays 60 includes a rectangular frame, open at the top and closed at the bottom with a web of foraminous material 61 such as insect wire screening held in place by wooden strips 62 and 63, as indicated in Figs. II and IV. Each of said trays has, at opposite ends thereof, pivot plates 65 rigidly connected therewith, conveniently by bolts 66 and nuts 67. Said plates 65 have double hook members 68, forming bottom hook recesses 69 for pivotal engagement with the respective chains 57 and 58. The upper hook recesses 70 receive the cross bars of the chain links in such manner as to limit the tilting movement of the trays upon the cross bars of said chains which are engaged in said recesses 69; when such tilting movement is clockwise with reference to Fig. VI. Each of the trays 60 has its axis of oscillation upon said chains 57 and 58, (which axis is common to two similar cross bars, one in each of said chains, indicated by the dash line 72 in Fig. IV,) in eccentric relation to the center of gravity of of the tray, so that the latter is overbalanced, by its portion extending above its axis in Fig. IV, to tilt clockwise with reference to Figs. I and VI when free to do so. Of course, the portion of each tray upon the opposite side of its axis is underbalanced. However, the tilting movement of said trays is controlled by providing each of said shafts 51 with a sprocket wheel 73, which is free to turn thereon but which is prevented from axial displacement by the collar 74 fixed on said shaft, as indicated in Fig. IV, in opposition to the chain wheel 56. Each of said sprocket wheels 73 carries a tray tilting endless chain 75; so that there is one such tilting chain for each column of trays 60 and detachably engaged with the latter by respective hinge plates 76 which are hingedly connected with said pivot plates 65 by respective pintles 77. Said plates 76 have double hook members 78 forming bottom hook recesses 79 and upper hook recesses 80 for engagement with the cross bars of the links of said chains 75 as indicated in Figs. IV and VI. The tilting movement of the trays 60 upon said chains 75, counterclockwise with reference to Fig. VI, is limited by the hook members 78 encountering the cross bars of said chains. Said hinge members 76 are hingedly connected with the trays 60 so as to permit the chains 75 connected therewith to be spread apart from the pivot chains 57, as far as possible, to permit the insertion and removal of the trays with respect to their assembled position indicated in Fig. I. However, the normal position of each hinge member 76 is that indicated in Figs. IV and VI. The construction and arrangement above described are such that it is only necessary to use said tilting chains 75 to tilt the trays 60 counter-clockwise with reference to Figs. I and VI and, when thus tilted, said chains may be temporarily detained with the trays in that position by engaging each chain 75 with a stud 82 projecting from the frame member 83. Whenever said chains 75 are released from their respective detent studs 82; the trays tilt, by gravity, clockwise, to the extent limited by the relation of the pivot plates 65 to the chains 57 and 58 with which they are respectively engaged at opposite ends of each tray.

Said frame members 83 are connected with the opposite side walls 8 and 9 by cross bars 84 indicated in Figs. I and II, and are rigidly connected with vertical partition members 85, forming series of tray compartments 86 as indicated in Fig. I, and having horizontal shelf flanges 87 to receive trays 60 which are removed from the supporting chains 57 and 58 and placed in said compartments 86, when the eggs therein are about to hatch; so that the hatching is conveniently effected near the floor of the incubator where the chicks may be conveniently handled. Said shelf flanges 87 are so spaced vertically as to receive two trays 60 between them, the upper tray being empty and inverted so as to form, with the lower tray, a cage preventing the escape of the hatched chicks until the covering tray is manually removed.

Said chains 57 and 58 are arranged to be progressed by rotation of said shafts 51, counter-clockwise with reference to Fig. I, so as to lower said trays 60 from the top to the bottom of each column suspended by said chains. Such progression of the trays may be effected intermittently or continuously and, in either case, the operation of the chains 75 may be so timed with respect to the movements of the chains 57 and 58, that the movement of the latter with the chains 75 engaged with their detent members 82, permits the trays 60 to tilt clockwise with reference to Figs. I and IV as above described; so that it is only necessary to move the chains 75 once for every two complete tilting movements of the trays.

In the form of my invention indicated in Figs. I, IV and V; I have provided each of said shafts 51 with a sprocket gear 89, which is similar to the sprocket gear 55, but which engages an endless chain 90, indicated in Fig. I, which is common to such gears 89 on the twelve shafts 51 arranged upon one side of the incubator and thus connects that series of shafts for contemporaneous control by said single chain 90. The arrangement above described is such that the weight of the trays 60 in the respective columns tends to turn each of the shafts 51 counter-clockwise with reference to Fig. I, and I find it convenient to control such tendency by providing one of the shafts 51 with an extension 91 journaled in the bracket 92 on the timber 93 and provided with the worm gear 94, which is rigidly connected with that shaft 51 and engaged by the worm 96 which is journaled in said bracket 92 and provided with the thrust bearing 97 surrounding its shaft 98, the lower end of which is squared at 99 or otherwise adapted to receive a wrench by which said worm 96 may be manually turned, at intervals, to permit said trays 60 to gravitatively progress downward with their chains 57 and 58 toward the compartments 86 in which the chicks are to be hatched.

As indicated in Fig. III, the columns of said trays 60 suspended by the chains 57 and 58 are arranged in oppositely counterpart series upon opposite sides of the central corridor in which the operator may manipulate the trays and chains as above described. However, in Fig. VII, I have indicated a modified form of my invention in which the shaft 100 is substituted for two of the short shafts 51 which are in axial alinement, so as to cooperatively couple the chains 90 upon opposite sides of the incubator, and said shaft 100 is provided with a worm gear 101 engaging a worm 102 provided with a shaft 103 rigidly connected with a worm gear 104 and engaging a worm 105 and so on, until the desired ratio of gearing is attained to permit such gravitative movement of the chains 57 and 58 with the trays which they support that a tray 60 inserted at the top of one of the columns reaches the bottom of the column in twenty-one days; such movement being regulated by the escapement comprising the lantern wheel 106 having the cylindrical teeth 107 which are alternately engaged by the pallets 108 and 109 which are carried by the pallet arm 110 which is directly connected with the pendulum 111 hung upon the axis 112 and arranged to be actuated by impacts of said teeth upon the inclined faces of said pallets.

In other words; the construction and arrangement above described are such that trays 60 containing fresh eggs may be hooked into engagement with the chains 57 and 58 at the top of the respective columns, lowered to the bottom thereof by movement of said chains and withdrawn from the bottom of each column for insertion in the compartments 86 when the chicks are about to hatch; the trays containing fresh eggs being inserted at the tops of the columns at the times when the trays are removed from the bottom of the columns.

The form of my invention shown in Figs. I to VI inclusive may be advantageously employed to effect what is known as "stage" incubation, in which eggs in various stages of incubation are contemporaneously present in the incubator, with the effect that the incubator may be used to hatch chicks every day instead of at intervals of the gestation period of twenty-one days and with the advantage that chicks thus produced are more readily marketed.

The chains 57 and 58 being free from trays 60; one or two trays containing fresh eggs, preferably with their longitudinal axes substantially vertical and the smaller ends of the eggs downward, may be suspended at the top of each of the twenty-four columns; each tray being overbalanced, clockwise, as viewed in Fig. I, so that each egg is tilted toward the right. Each tray is preferably tilted in the opposite direction, at intervals of six or eight hours, by pulling down upon the portion of each chain 75 engaged with the hinge plate 76, to the limiting angle permitted by the latter, and is detained in such position by hooking each chain 75 over its detent stud 82. After remaining at the same elevation for a time, say twenty-four hours, said trays 60 may be lowered by counter-clockwise movement of the shafts 51, effected by manually turning the worm shaft 98 local to each group of twelve columns of trays, and to such an extent as to permit the addition of one or more trays containing fresh eggs, at the top of each column. Such lowering movement of the trays may be so timed as to effect the tilting movement of the trays previously suspended in the chains 57 and 58, without manipulation of the tilting chains 75; the latter remaining stationary.

The operation above described may be repeated, at suitable intervals, until the eggs in the lowermost trays suspended in the chains 57 and 58, are ready to hatch. Thereupon, those trays may be removed from the chains and placed in the compartments 86, with empty trays 60 inverted over them to prevent the escape of the chicks. Of course, the removal of the lowermost trays may be effected at one of the intervals of time at which trays containing fresh eggs have been inserted at the tops of the columns; so that the apparatus is operated with a predetermined regularity or rhythm of steps in the incubating process.

When the eggs in the trays in the compartments 86 have been hatched; those trays may be withdrawn from said compartments and the chicks removed therefrom for shipment and the shell débris discarded.

I find it convenient to thus operate said incubator by the addition and subtraction of two trays per day with respect to each column; so that the contents of forty-eight trays are hatched every day instead of the contents of two hundred and eighty-eight trays being hatched at intervals of twenty-one days, as would be the case if all of the trays were contemporaneously charged with fresh eggs.

However, I do not desire to limit myself to the specific method of incubation above described, as it is obvious that the incubator aforesaid may be otherwise used.

In the form of my invention contemplated in Figs. VII and VIII; an incubator may be operated to effect similar "stage" incubation, by placing a single tray of fresh eggs at the top of each of the twenty-four columns and initiating the operation of the escapement by permitting the pendulum 111 to operate, at such a rate that the first trays thus placed in the incubator are continuously progressed toward the compartments 86 so as to be presented at the bottom of the chains 57 and 58 on the twentieth day thereafter. Such continuous movement of the trays is so slow that trays may be inserted and removed with respect to the chains 57 and 58 and 75, without cessation of such movement and with the advantage that it is unnecessary for the operator to manipulate the apparatus as is required when the worm shafts 98 and their appurtenances are employed. However, the tilting movements of the trays 60 may be effected in the manner above described, i. e., by manual movements of the chains 75 in conjunction with the automatic movement of the chains 57 and 58 and with the effect of turning the eggs at the desired intervals, to prevent sticking of the embryo to the membranes in the shells, which results if the eggs are not turned at comparatively short intervals during the period of gestation.

In either case; the fans 49 are operated, preferably continuously, during the incubating operation to agitate the air within the incubator inclosure and introduce fresh air at such a rate as is most efficient for the purpose of incubation. The rate of admission of fresh air may be variably determined by controlling the effective area of the fresh air inlet port 6, by the valve 7, and the escape of foul air may be effected by coordinate control of the effective area of the air vents 10 and 11 by the respective valves 12 and 13.

It is to be particularly noted that said fans 49 are preferably so operated as to draw the air upwardly through the ports 48 in the doors 45, thus creating a partial vacuum below said doors, inducing the inflow of fresh air through the port 6 and subjecting the air to pressure throughout the other portions of the incubator inclosure, so that it has a tendency to escape from said vents 10 and 11 along the side walls 8 and 9 of the incubator.

It is to be particularly noted that the air thus agitated in the incubator inclosure as above described, although forced downwardly with respect to the twenty-four columns of trays 60 as it is discharged upon opposite sides of the housing 38 in its distribution through the openings between the vertical hangers 39, as indicated by the arrows in Fig. III, returns to the central corridor substantially horizontally through the passageways 115, as indicated by the arrows in Fig. II.

It may be observed that if the vents 10 and 11 be closed; the fans only serve to agitate the air to a sufficient degree in the upper half of the incubator inclosure; but that the opening of said vents 10 and 11, more or less, causes the agitation of the air from the top to the bottom of the incubator inclosure, as indicated by the arrows in Fig. II.

As it is necessary to subject the eggs to a temperature of from 99° to 103° F., during the incubation thereof; it is necessary to provide means to warm the atmosphere in which the incubation is effected and particularly for environment of the eggs in the earlier stages of incubation; as the eggs in the preliminary stages of incubation absorb heat and the eggs in the later stages of incubation generate heat; incidentally absorbing moisture and oxygen from the surrounding air and adding carbon dioxide thereto in increasing qantities as the incubation proceeds. Therefore, the atmosphere in the incubator may be suitably warmed either by heating the air introduced through the port 6, by means exterior to the incubator inclosure illustrated, or by the location of hot water or steam pipes 117 within the housing 38, or otherwise. Moreover, it is desirable to provide means to variably determine the humidity of the atmosphere in the incubator inclosure and I prefer to provide a steam pipe 118, at the top of the housing 38, as indicated in Fig. II, with minute orifices controlled by valves 120 through which steam may be permitted to escape and mix with the air passing from the fans 49 in said housing.

However, I do not desire to limit myself to the precise details of construction and arrangement or method of procedure herein set forth, as it is obvious that various modifications may be made therein without departing from the essential features of my invention, as defined in the appended claims.

I claim:

1. In a mechanism constructed and arranged to progress egg trays in an incubator vertically from a region of introduction to a region of discharge, and to tilt the eggs at intervals during such progression, including a horizontal shaft; a pair of sprocket wheels tight on said shaft; a pair of tray supporting endless chains engaged with and pendent said trays; a third sprocket wheel, loose on from said wheels respectively at the ends of said shaft; a tray tilting endless chain engaged with and pendent from said loose sprocket wheel; a series of egg trays having means at each end thereof arranged to pivotally engage said supporting chains and means at one end arranged to pivotally engage said tilting chain; and means arranged to detain said tilting chain with the trays tilted in different positions of inclination.

2. In a mechanism constructed and arranged to progress egg trays in an incubator vertically from a region of introduction to a region of discharge, and to tilt the eggs at intervals during such progression, including a horizontal shaft; a pair of sprocket wheels tight on said shaft; a pair of tray supporting endless chains engaged with and pendent from said wheels respectively at the ends of said trays; a third sprocket wheel, loose on said shaft; a tray tilting endless chain engaged with and pendent from said loose sprocket wheel; a series of egg trays having means at each end thereof arranged to pivotally engage said supporting chains and means at one end arranged to pivotally engage said tilting chain; and means arranged to detain said tilting chain with the trays tilted in different positions of inclination; the pivot means engaging said supporting chains having a common axis eccentric to the tray; whereby the tray is overbalanced and tends to gravitate to a vertical plane; said supporting chains and the pivot means engaging them being coordinated to limit the angle of inclination of said trays in the direction in which they are overbalanced.

3. In a mechanism constructed and arranged to progress egg trays in an incubator vertically from a region of introduction to a region of discharge, and to tilt the eggs at intervals during such progression, including a horizontal shaft; a pair of sprocket wheels tight on said shaft; a pair of tray supporting endless chains engaged with and pendent from said wheels respectively at the ends of said trays; a third sprocket wheel, loose on said shaft; a tray tilting endless chain engaged with and pendent from said loose sprocket wheel; a series of egg trays having means at each end thereof arranged to pivotally engage said supporting chains and means at one end arranged to pivotally engage said tilting chain; means arranged to detain said tilting chain with the trays tilted in different positions of inclination, and worm gearing, controlling the turning movement of said shaft.

4. In a mechanism constructed and arranged to progress egg trays in an incubator vertically from a region of introduction to a region of discharge, and to tilt the eggs at intervals during such progression, including a series of horizontal shafts arranged in parallel relation; each of said shafts having a pair of sprocket wheels tight thereon and a pair of tray supporting endless chains engaged with and pendent from said wheels respectively at the ends of said trays; and a third sprocket wheel, loose on said shaft; and a tray tilting endless chain engaged with and pendent from said loose sprocket wheel; series of egg trays each having means at each end thereof arranged to pivotally engage said supporting chains; whereby the weight of said trays tends to turn said shafts; and means at one end, of each of said trays, arranged to pivotally engage said tilting chains; means arranged to detain said tilting chains with the trays tilted in different positions of inclination; and means arranged to control the turning movement of said shafts, including means coordinately connecting said shafts for contemporaneous turning movement, and an escapement device.

5. In a mechanism constructed and arranged to progress egg trays in an incubator vertically from a region of introduction to a region of discharge, and to tilt the eggs at intervals during such progression, including a horizontal shaft; a pair of belt wheels tight on said shaft; a pair of tray supporting endless belts engaged with and pendent from said wheels respectively at the ends of said trays; a third belt wheel, loose on said shaft; a tray tilting endless belt engaged with and pendent from said loose belt wheel; a series of egg trays having means at each end thereof arranged to pivotally engage said supporting belts and means at one end arranged to pivotally engage said tilting belt; and means arranged to detain said tilting belt with the trays tilted in different positions of inclination; including a stationary member, independent of said shaft, adapted to be engaged by said tilting belt.

6. In a mechanism constructed and arranged to progress egg trays in an incubator vertically from a region of introduction to a region of discharge, and to tilt the eggs at intervals during such progression, including a horizontal shaft; a pair of belt wheels tight on said shaft; a pair of tray supporting endless belts engaged with and pendent from said wheels respectively at the ends of said trays; a third belt wheel, loose on said shaft; a tray tilting endless belt engaged with and pendent from said loose belt wheel; a series of egg trays having means at each end thereof arranged to pivotally engage said supporting belts and means at one end arranged to pivotally engage said tilting belt; and means arranged to detain said tilting belt with the trays tilted in different positions of inclination; including a stationary member, independent of said shaft, adapted to be engaged by said tilting belt; the pivot means engaging said supporting belts having a common axis eccentric to the tray; whereby the tray is overbalanced and tends to gravitate to a vertical plane; said belts and the pivot means engaging them being coordinated to limit the angle of inclination of said trays in opposite directions.

7. In a mechanism constructed and arranged to progress egg trays in an incubator vertically from a region of introduction to a region of discharge, and to tilt the eggs at intervals during such progression, including a horizontal shaft; a pair of belt wheels tight on said shaft; a pair of tray supporting endless belts engaged with and pendent from said wheels respectively at the ends of said trays; a third belt wheel, loose on said shaft; a tray tilting endless belt engaged with and pendent from said loose belt wheel; a series of egg trays having means at each end thereof arranged to pivotally engage said supporting belts and means at one end arranged to pivotally engage said tilting belt with the trays tilted in different positions of inclination; the pivot means engaging said supporting chains having a common axis eccentric to the tray; whereby the tray is overbalanced and tends to gravitate to a vertical plane; said belts and the pivot means engaging them being coordinated to limit the angle of inclination of said trays in opposite directions.

8. In a mechanism constructed and arranged to progress egg trays in an incubator vertically from a region of introduction to a region of discharge, and to tilt the eggs at intervals during such progression, including a horizontal shaft; a pair of belt wheels tight on said shaft; a pair of tray supporting endless belts engaged with and pendent from said wheels respectively at the ends of said trays; a third belt wheel, loose on said shaft; a tray tilting endless belt engaged with and pendent from said loose belt wheel; a series of egg trays having means at each end thereof arranged to pivotally engage said supporting belt and means at one end arranged to pivotally engage said tilting belt with the trays tilted in different positions of inclination; the pivot means engaging said supporting chains having a common axis eccentric to the tray; whereby the tray is overbalanced and tends to gravitate to a vertical plane; said belts and the pivot means engaging them being coordinated to limit the angle of inclination of said trays in the direction in which they are underbalanced.

9. In a mechanism constructed and arranged to progress egg trays in an incubator vertically from a region of introduction to a region of discharge, and to tilt the eggs at intervals during such progression, including a horizontal shaft; a pair of belt wheels tight on said shaft; a pair of tray supporting endless belts engaged with and pendent from said wheels respectively at the ends of said trays; a third belt wheel, loose on said shaft; a tray tilting endless belt engaged with and pendent from said loose belt wheel; a series of egg trays having means at each end thereof arranged to pivotally engage said supporting belts and means at one end arranged to pivotally engage said tilting belt; said belts and the pivot means engaging them being coordinated to limit the angle of inclination of said trays; and means arranged to adjustably detain said trays tilted in different positions of inclination.

10. In a mechanism constructed and arranged to progress egg trays in an incubator from a region of introduction to a region of discharge, and to tilt the eggs at intervals during such progression, including a shaft; a pair of belt wheels on said shaft; a pair of tray supporting endless belts engaged with and pendent from said wheels respectively at the ends of said trays; a third belt wheel, movable independently of said shaft; a tray tilting endless belt engaged with and pendent from said third belt wheel; a series of egg trays having means at each end thereof arranged to pivotally engage said supporting belts and means arranged to pivotally engage said tilting belt; whereby a plurality of trays may be simultaneously tilted by a single movement of said third belt.

11. In a mechanism constructed and arranged to progress egg trays in an incubator from a region of introduction to a region of discharge, and to tilt the eggs at intervals during such progression, including a shaft; a pair of belt wheels on said shaft; a pair of tray supporting endless belts engaged with and pendent from said wheels respectively at the ends of said trays; a third belt wheel, movable independently of said shaft; a tray tilting endless belt engaged with and pendent from said third belt wheel; a series of egg trays having means at each end thereof arranged to pivotally engage said supporting belts and means arranged to pivotally engage said tilting belt; whereby a plurality of trays may be simultaneously tilted by a single movement of said third belt; and means, distinct from said tilting belt, arranged to selectively detain said trays tilted in different positions of inclination.

12. The combination with a vertically extending series of egg trays; of a pair of endless belts pendent at respective ends of said trays; means for independently detachably pivotally mounting each tray upon said belts, in eccentric relation to the center of gravity of the tray; a third endless belt; and means for detachably engaging each of said trays with said third belt; whereby simultaneous tilting movement of a plurality of egg trays may be effected by a single movement of said third belt.

13. In an incubator, the combination with an inclosure; of two series of shafts arranged in parallel relation; said series being axially spaced and journaled upon opposite sides of said inclosure in the upper portion thereof; a pair of endless belts carried by each of said shafts and arranged to suspend a vertical series of egg trays from each shaft; means cooperatively connecting all of said shafts for simultaneous turning movement; and a single escapement device movable to permit simultaneous movement of said shafts; whereby egg trays suspended from said shafts may be simultaneously progressed vertically from a region of introduction to a region of discharge.

14. In an incubator, the combination with an inclosure; of two series of shafts arranged in parallel relation; said series being axially spaced and journaled upon opposite sides of said inclosure in the upper portion thereof; a pair of endless belts carried by each of said shafts and arranged to suspend a vertical series of egg trays from each shaft; means cooperatively connecting all of said shafts for simultaneous turning movement; and a single escapement device movable to permit simultaneous movement of said shafts; whereby egg trays suspended from said shafts may be simultaneously progressed vertically from a region of introduction to a region of discharge, including worm gearing and a pendulum arranged to oscillate and permit step by step turning movement of said gearing.

15. The combination with a vertically extending series of egg trays; of a pair of endless belts pendent at respective ends of said trays; means for independently detachably pivotally mounting each tray upon said belts; a third endless belt; and means for detachably engaging each of said trays with said third belt; whereby simultaneous tilting movement of a plurality of egg trays may be effected by a single movement of said third belt.

16. In an incubator, the combination with an inclosure; of two series of shafts arranged in horizontal parallel relation; said series being axially spaced and journaled upon opposite sides of said inclosure in the upper portion thereof; a pair of endless belts carried by each of said shafts and arranged to suspend a vertical series of egg trays from each shaft; means cooperatively connecting all of said horizontal shafts for simultaneous turning movement; and a single device movable, step by step, to permit simultaneous movement of said shafts; whereby egg trays suspended from said shafts may be simultaneously progressed vertically from a region of introduction to a region of discharge.

In testimony whereof, I have hereunto signed my name at Frenchtown, New Jersey, this twentieth day of June, 1927.

WILLIAM FINNEY HILLPOT.

CERTIFICATE OF CORRECTION.

Patent No. 1,722,214.                                                              Granted July 23, 1929, to

WILLIAM FINNEY HILLPOT.

It is hereby certified that error appears in the printed specification of the above numbered patent requiring correction as follows: Page 1, line 100, for the misspelled word "sumultaneous" read "simultaneous"; page 5, strike out lines 57 and 58, claim 1, and insert instead "from said wheels respectively at the ends of said trays; a third sprocket wheel, loose on"; and that the said Letters Patent should be read with these corrections therein that the same may conform to the record of the case in the Patent Office.

Signed and sealed this 20th day of August, A. D. 1929.

(Seal)                                                                             M. J. Moore,
                                                                                         Acting Commissioner of Patents.